(12) United States Patent
Risley

(10) Patent No.: US 7,726,461 B2
(45) Date of Patent: Jun. 1, 2010

(54) APPARATUSES AND METHODS FOR CONTROLLING THE SPACING OF AND EJECTING CONVEYED OBJECTS

(75) Inventor: Robert F Risley, Crownsville, MD (US)

(73) Assignee: Laitram, L.L.C., Harahan, LA (US)

( * ) Notice: Subject to any disclaimer, the term of this patent is extended or adjusted under 35 U.S.C. 154(b) by 91 days.

(21) Appl. No.: 12/190,190

(22) Filed: Aug. 12, 2008

(65) Prior Publication Data

US 2010/0038209 A1   Feb. 18, 2010

(51) Int. Cl.
*B65G 47/46* (2006.01)

(52) U.S. Cl. ............... 198/370.02; 198/890.1; 198/369.5

(58) Field of Classification Search ........... 198/890, 198/890.1, 369.2, 369.5, 370.01, 370.02, 198/370.03

See application file for complete search history.

(56) References Cited

U.S. PATENT DOCUMENTS

| | | | | |
|---|---|---|---|---|
| 5,396,980 A | * | 3/1995 | Sobrero | 198/370.02 |
| 5,826,695 A | * | 10/1998 | Van Den Goor | 198/370.02 |
| 5,950,798 A | * | 9/1999 | Bonnet | 198/370.02 |
| 6,044,957 A | * | 4/2000 | Guttinger | 198/370.01 |
| 6,543,602 B1 | * | 4/2003 | Bonnet | 198/370.03 |
| 7,311,192 B2 | | 12/2007 | Fourney | |
| 7,426,992 B2 | | 9/2008 | Fourney | |
| 7,537,105 B2 | | 5/2009 | Fourney | |
| 2008/0264757 A1 | | 10/2008 | Fourney | |

* cited by examiner

*Primary Examiner*—James R Bidwell
(74) *Attorney, Agent, or Firm*—Thomas, Kayden, Horstemeyer & Risley, LLP

(57) ABSTRACT

In one embodiment, apparatus for controlling spacing of objects conveyed by an object conveyor and for selectively ejecting objects from the object conveyor include flights that extend transversely across the object conveyor to limit travel of the objects to control their relative spacing, and ejectors associated with the flights that can be selectively actuated to eject the objects whose travel has been limited by the associated flights.

27 Claims, 7 Drawing Sheets

APPARATUSES AND METHODS FOR CONTROLLING THE SPACING OF AND EJECTING CONVEYED OBJECTS

BACKGROUND

It is often desirable to arrange conveyed objects to have a predetermined spacing along the travel direction of a conveyor belt. Such spacing enables downstream processing, such as merging objects from multiple conveying lanes into a single lane.

There are several known systems for controlling the spacing of conveyed objects. Some such systems use sensors and selectively-actuable stops that are controlled in response to information detected by the sensors. Unfortunately, such systems are relatively complex and can significantly limit the speed at which the objects are conveyed.

Other known systems use stops that are not sensor controlled. Although less complex than sensor-controlled systems, the stops of such systems are more likely to, at least intermittently, damage the conveyed objects. For instance, a conveyed object can be punctured or deformed when it runs into a partially-extended stop or when a stop is forced open against an object that is already present in the conveyance path.

In addition, it is further desirable to be able to eject individual objects for various reasons. For example, it is desirable to be able to eject defective objects from a stream of conveyed objects.

BRIEF DESCRIPTION OF THE DRAWINGS

The disclosed apparatuses and methods can be better understood with reference to the following drawings. The components in the drawings are not necessarily drawn to scale.

DETAILED DESCRIPTION

Described in the following are apparatuses and methods that can be used to control the spacing of objects being transported by a conveyor and to selectively eject objects from the conveyor. In some embodiments, an apparatus comprises a vertically-oriented conveyor belt that is positioned adjacent a horizontally-oriented conveyor belt that conveys objects. The vertically-oriented conveyor belt includes flights that can be actuated to control the spacing and position of the objects on the horizontally-oriented conveyor. In addition, the vertically-oriented conveyor comprises ejectors that can be selectively actuated to eject individual objects from the horizontally-oriented conveyor belt.

In the following, various embodiments of apparatuses and methods are disclosed. Although specific embodiments are described and illustrated, those embodiments are mere example implementations of the disclosed apparatuses and methods and it is noted that other embodiments are possible. All such embodiments are intended to fall within the scope of this disclosure.

Figure 1:
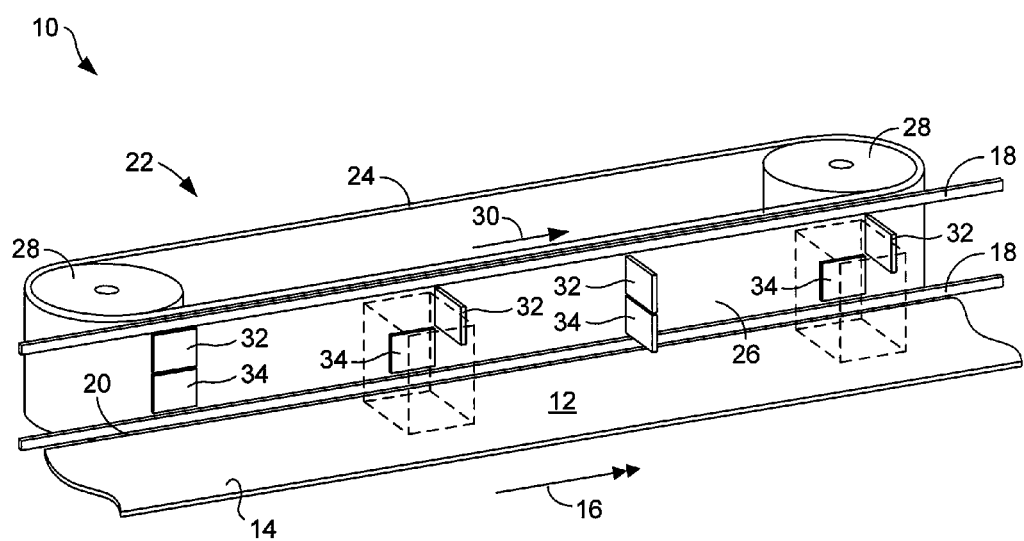
FIG. 1 is a schematic perspective view of an embodiment of a system for controlling the spacing of and ejecting conveyed objects.

Turning to the figures, in which like numerals identify corresponding components, FIG. 1 schematically illustrates an embodiment of a system 10 that can be used to control the spacing of various objects that are being transported and, if necessary or desired, to eject selected individual objects. As indicated in FIG. 1, the system 10 comprises a horizontally-oriented conveyor belt 12 of a horizontally-oriented conveyor (not shown). The conveyor belt 12 includes an outer surface 14 that transports objects, O, in a direction of belt travel indicated by arrow 16. The particular construction of the conveyor belt 12 is relatively unimportant. Preferably, however, the material of the surface of the conveyor belt 12 is selected such that the objects, O, can slide across the outer surface 14 to enable adjustment of their position on the conveyor belt.

As is further indicated in FIG. 1, the system 10 can comprise one or more guide rails 18 that are positioned adjacent a lateral edge 20 of the horizontally-oriented conveyor belt 12. When provided, the rails 18 maintain the lateral positioning of the objects, O, and further prevent tipping of the objects from the conveyor belt 12. Although guide rails 18 are only shown provided along one edge of the conveyor belt 12, similar guide rails can be provided along the opposite edge of the belt, if desired.

Also positioned adjacent the edge 20 of the conveyor belt 12 is an object spacing control and ejection apparatus 22. The apparatus 22 generally operates to control the relative spacing of the objects, O, that are conveyed by the conveyor belt 12 and, when desired, to eject selected objects from the conveyor belt. Given that spacing control may be used for various operations that require particular timing, such as merging multiple conveyor lines into a single conveyor line, the apparatus 22 may also be considered to be a timing apparatus.

In the embodiment of FIG. 1, the object spacing control and ejection apparatus 22 comprises a vertically-oriented conveyor that drives a vertically-oriented conveyor belt 24. In the context of this disclosure, the term "vertically-oriented" means that the outer surface 26 of the conveyor belt 24, which could otherwise be used to convey objects if oriented horizontally, is generally vertical. Because of its vertical orientation, the vertically-oriented conveyor, which from this point will be identified by reference numeral 22, is generally orthogonal relative to the conveyor belt 12 and, therefore, the outer surface 26 of the conveyor belt 24 is approximately 90 degrees out of phase from the outer surface 14 of the conveyor belt 12. In some embodiments, the conveyor belt 24 comprises a modular conveyor belt that includes a plurality of interconnected modules.

With further reference to FIG. 1, the vertically-oriented conveyor belt 24 is driven and, at least partially, supported by sprockets 28. As indicated in the figure, the sprockets 28 drive the conveyor belt 24 in the direction indicated by arrow 30 so that a portion of the conveyor belt adjacent the objects, O, moves in the same direction as the horizontally-oriented conveyor belt 12 and, therefore, the same direction as the objects. The conveyor belt 24, however, is operated at a slower linear speed than the conveyor belt 12 to enable the spacing control functionality described below.

As is further indicated in FIG. 1, the conveyor belt 24 comprises multiple flights 32 that are located in predetermined positions along the length of the conveyor belt 24. In some embodiments, the flights are equally spaced from each other along that length. Regardless, the flights 32 serve as stops that limit the travel of the objects, O, to control their relative spacing. In at least some embodiments, the flights 32 are pop-out flights, meaning that they can be displaced from a retracted state in which they are substantially parallel to the outer surface 26 of the conveyor belt 24 to an extended state in which they are substantially perpendicular to that outer surface. When actuated, the flights 32 extend transversely across the conveyor belt 12, perpendicular to the direction of belt travel 16. As indicated in FIG. 1, the flights 32 need not extend across the entire width of the conveyor belt 12. Instead, the flights 32 may only extend across a portion of that width, for example approximately half the width of the belt 12. In the embodiment shown in FIG. 1, actuated flights 32 extend over the conveyor belt 12 from between the support rails 18. The actuation of the flights 32 that facilitates such extension is described below in relation to FIGS. 4A and 4B.

With further reference to FIG. 1, the conveyor belt 24 also comprises multiple ejectors 34 that operate to eject selected objects, O, from the conveyor belt 12. As indicated in FIG. 1, the ejectors 34 are colocated with the flights 32 along the length of the conveyor belt 24. In the embodiment of FIG. 1, the ejectors 34 are positioned directly below the flights 32. In at least some embodiments, the ejectors 34 are pop-out ejectors, meaning that, like the flights 32, they can be displaced from a retracted state in which they are substantially parallel to the outer surface 26 of the conveyor belt 24 to an extended state in which they are substantially perpendicular to that outer surface. Unlike the flights 32, however, the ejectors 34 can be selectively actuated to eject certain individual objects, O, from the conveyor belt 12, but not others. In some embodiments, defective objects, once detected, can be ejected. By way of example, the selected objects can be ejected into an ejection bin or a further horizontally-oriented conveyor belt (not shown). In some embodiments, the ejectors 34 can have construction and operation similar to the flights 32. Accordingly, the ejectors 34 can extend through the rails 18 and transversely across the conveyor belt 12 when actuated. Actuation of the ejectors 34 is described below in relation to FIGS. 5A-5D.

Figure 2:
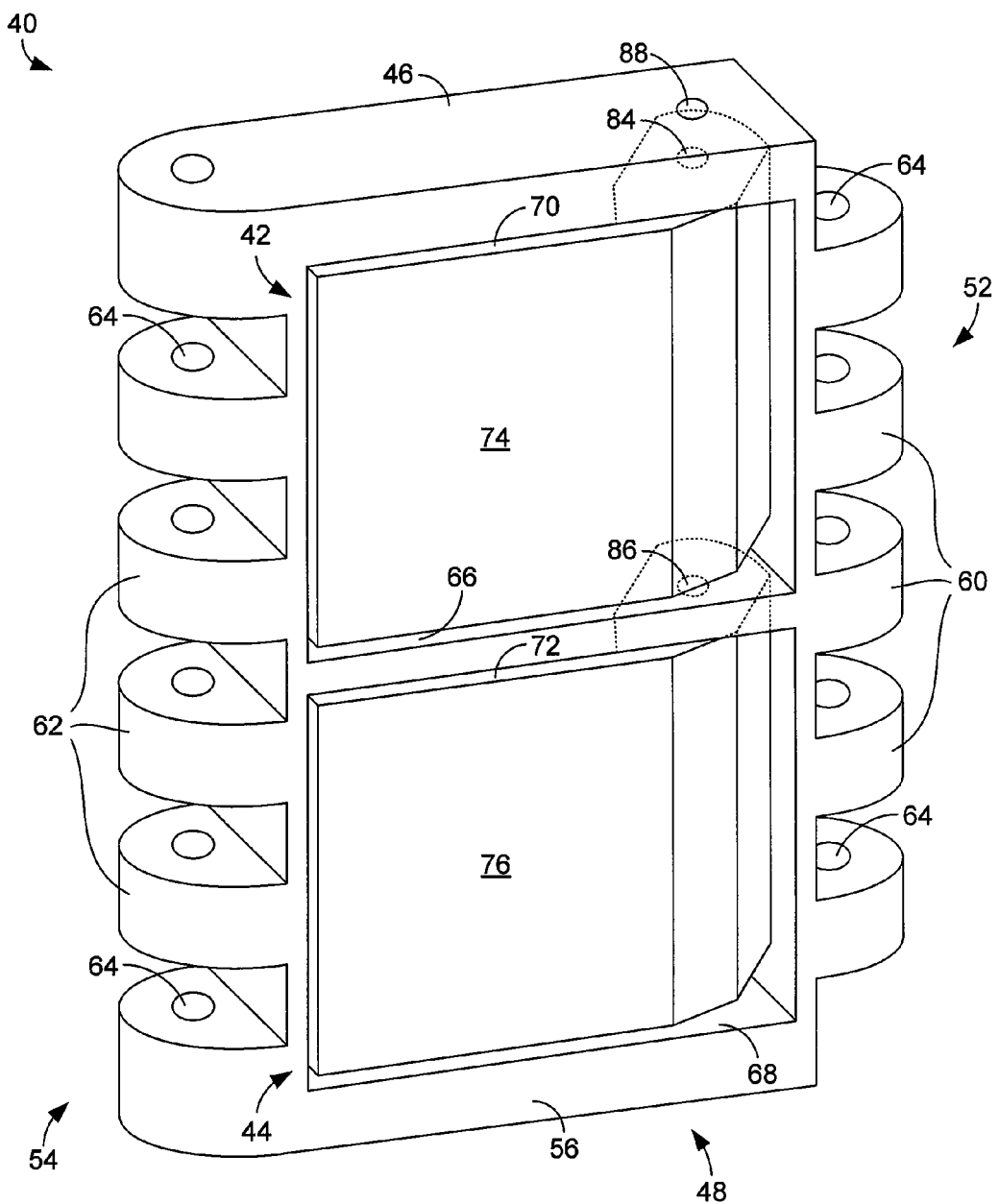
FIG. 2 is a front perspective view of an embodiment of a conveyor belt module for a conveyor belt that can be used in a system for controlling the spacing of and ejecting conveyed objects.
Figure 3:
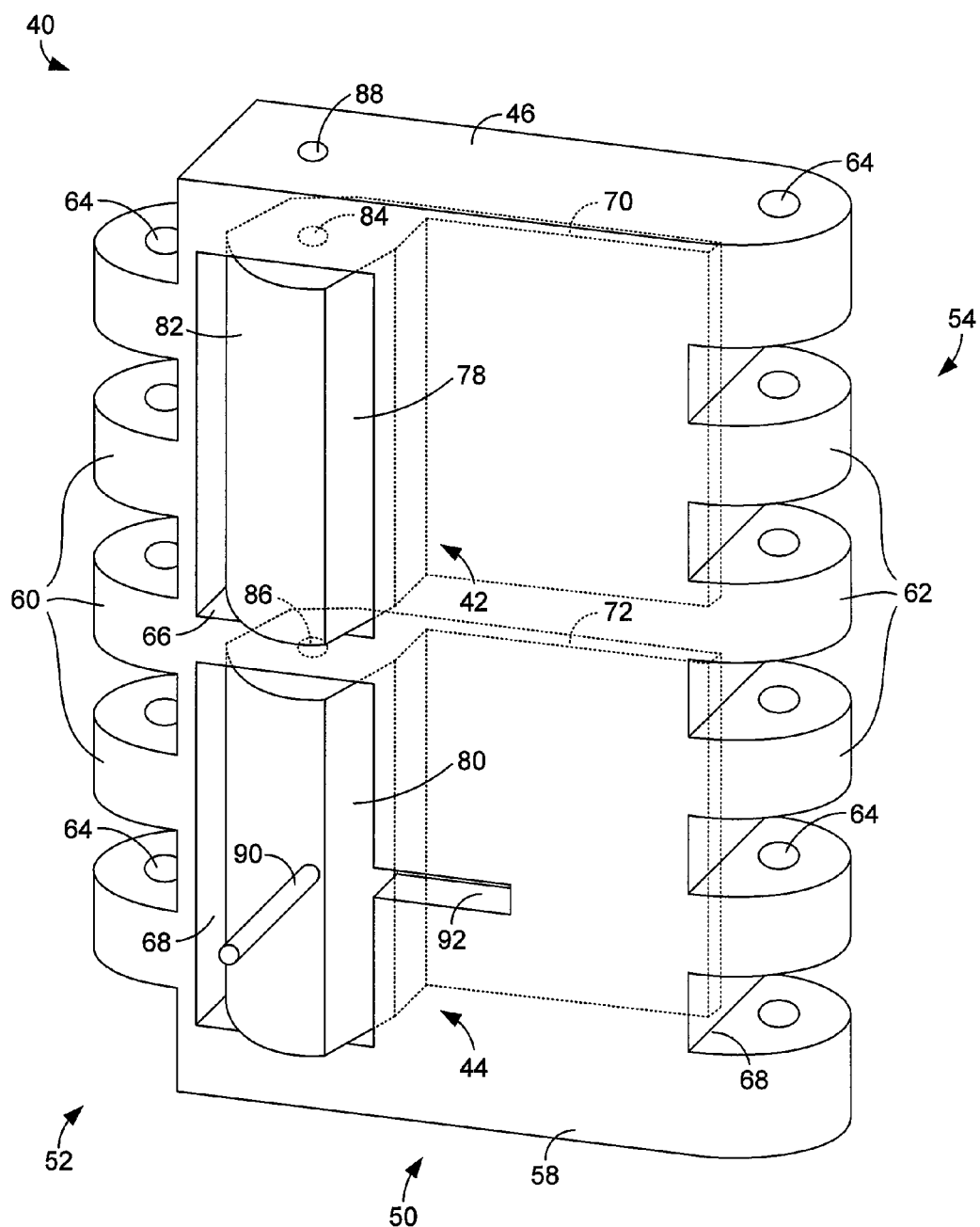
FIG. 3 is a rear perspective view of the conveyor belt module of FIG. 2.

As mentioned above, the vertically-oriented conveyor belt 24 can comprise a modular conveyor belt that includes a plurality interconnected modules. FIGS. 2 and 3 illustrate an example embodiment of a conveyor belt module 40 that can be used in such a conveyor belt. More particularly, FIGS. 2 and 3 illustrate an example embodiment of a conveyor belt module 40 that comprises an actuable flight 42 and selectively-actuable ejector 44. The conveyor belt may comprise many such modules 40, which may be equally spaced from each other along the length of the belt.

As shown in FIGS. 2 and 3, the conveyor belt module 40 generally comprises a body 46 that defines a front side 48, a rear side 50, a leading edge 52, and a trailing edge 54. In some embodiments, the body 46 comprises a unitary component constructed of a plastic material. The front side 48 includes a front surface 56 and the rear side 50 includes a rear surface 58. In some embodiments, the front and rear surfaces 56 and 58 are planar and generally parallel to each other. Provided along the leading and trailing edges 52 and 54 are coupling elements 60 and 62, respectively. In the illustrated embodiment, the coupling elements 60, 62 are formed as complementary interleaving fingers. In such embodiments, the coupling elements 60 of one module of the belt can interleave with coupling elements 62 of an adjacent module, and the two modules can be pivotally coupled together with a pin or rod (not shown) that can be passed through openings 64 of the coupling elements to form hinges.

The conveyor belt module body 46 further comprises at least one cavity that is adapted to receive one or both of the flight 42 and the ejector 44. In the embodiment shown in FIG. 2, the body 46 comprises a first or upper cavity 66 in which the flight 42 is disposed and a second or lower cavity 68 in which the ejector 44 is disposed. As is apparent from FIGS. 2 and 3, the cavities 66, 68 extend from the front surface 56 (FIG. 2) to the rear surface 58 (FIG. 3).

The flight 42 and the ejector 44 can have similar configurations. In some embodiments, the flight 42 and ejector 44 are substantially identical with the exception of an actuation element provided on the ejector, which is discussed below. As shown best in FIG. 2, the flight 42 and the ejector 44 each comprise an object interface 70, 72 that is adapted to interface with an object. More specifically, the object interface 70 of the flight 42 is adapted to limit travel of an object to control its spacing relative to other objects being conveyed, and the object interface 72 of the ejector 44 is adapted to eject a selected object from its conveyor. In the illustrated embodiment, the object interfaces 70, 72 comprise generally planar members. Notably, however, other configurations are possible as long as the stopping and ejecting functions can be served. As is apparent from FIG. 2, the object interfaces 70, 72 can comprise planar outer surfaces 74, 76 that are generally parallel with the front surface 56 of the module 40 and, therefore, generally parallel with the outer surface of a conveyor belt in which the module is provided. In some embodiments, the outer surfaces 74, 76 can further be generally flush with the front surface 56.

As shown best in FIG. 3, the flight 42 and the ejector 44 each further comprise a body 78, 80 that is integral with its respective object interface 70, 72. At least the body 78 of the flight 42 comprises a rounded cam surface 82. As described below in relation to FIGS. 4A and 4B, the cam surface 82 facilitates actuation of the flight 42 so that it can be extended or popped-out when it is adjacent a horizontally-oriented conveyor on which objects whose spacing is to be controlled are being conveyed. In some embodiments, the cam surface 82 comprises a relatively low-friction material to enable actuation of the flight with relatively little force. Each body 78, 80 comprises an opening 84, 86 through which one or more pins or rods (not shown) can be passed to pivotally mount the flight 42 and the ejector 44 within the body 46. In some embodiments, the flight 42 and the ejector 44 can each pivot respective to a single pin or rod that extends through an opening 88 formed in the body 46.

With continued reference to FIG. 3, the ejector 44 includes an actuation element 90 that extends outward from the ejector body 80. In the illustrated embodiment, the actuation element 90 comprises a pin that extends from the body 80 in a direction that is generally perpendicular to the rear surface 58 of the module body 46. As described below in relation to FIGS. 5A-5D, the actuation element 90 can be used to selectively actuate the ejector 44. More particularly, the actuation element 90 can be tripped by an ejector actuator so as to cause the ejector 44 to pivot. In some embodiments, the module body 46 comprises a recess 92 configured to receive the actuation element 90 when the ejector 44 fully pivots (i.e., through approximately 90°).

Figure 4A:
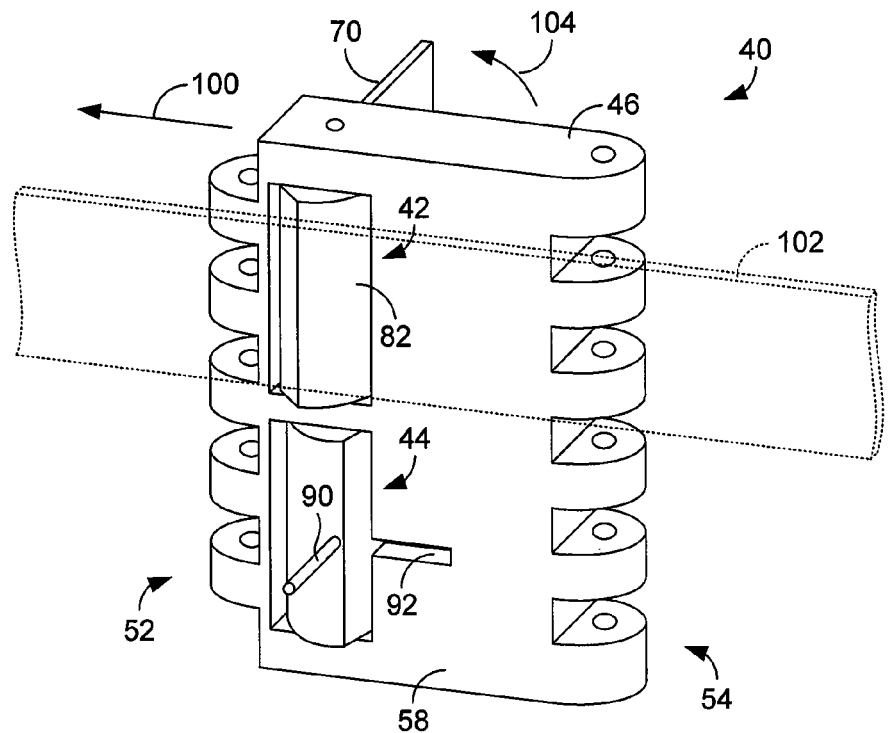
FIGS. 4A and 4B are rear and front perspective views, respectively, of the conveyor belt module of FIGS. 2 and 3 illustrating actuation of a flight of the module.
Figure 4B:
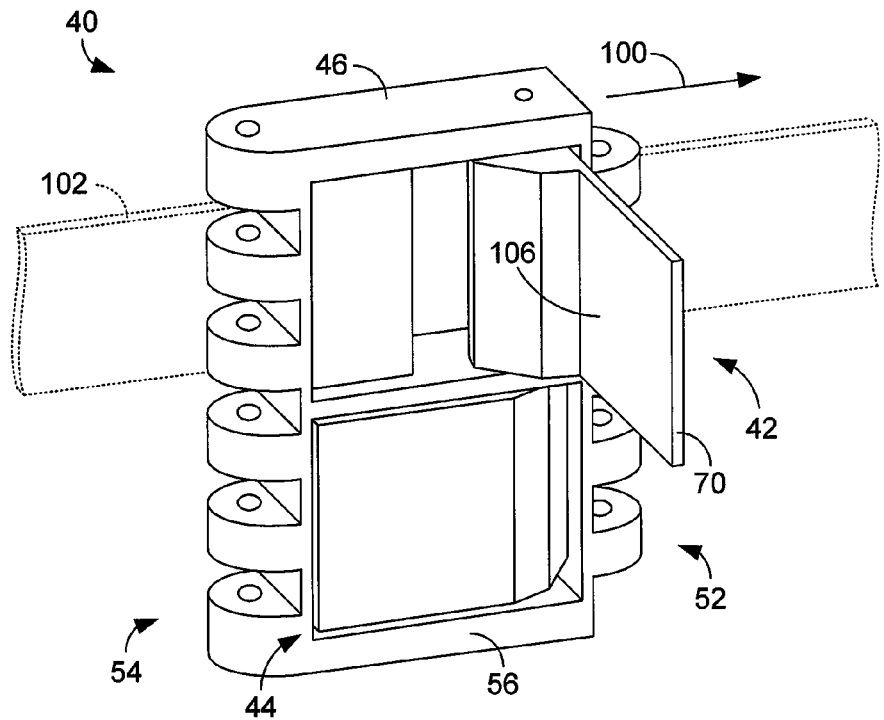

FIGS. 4A and 4B illustrate actuation of the module flight 42. In FIGS. 4A and 4B, it is assumed that the module 40 forms part of a vertically-oriented conveyor belt, which has been omitted from the figures for purposes of clarity. As indicated in FIG. 4A, the module 40, and therefore the conveyor belt, is traveling in the direction identified by arrow 100 past a stationary flight actuation member 102. By way of example, the actuation member 102 comprises a thin bar or plate of metal or plastic material that is mounted to a vertically-oriented conveyor of which the vertically-oriented conveyor belt forms a part. The actuation member 102 is positioned close enough to the conveyor belt to make contact with the cam surface 82 of the flight 42 as the module 40 passes by the actuation member. Notably, the actuation member 102 is sized, configured, and positioned so as not to make similar contact with the ejector 44. Due to the contact between the actuation member 102 and the cam surface 82, the flight 42 pivots so as to cause the object interface 70 to swing outward from the module body 46, as indicated by arrow 104. FIG. 4B illustrates the flight 42 in its fully-extended position. As indicated in that figure, the object interface 70 of the flight 42 is generally perpendicular to the front surface 56 of the module body 46 when the flight is fully extended. In that position, the flight 42 can limit the travel of an adjacent object when the object abuts an inner surface 106 of the object interface 70.

Figure 5A:
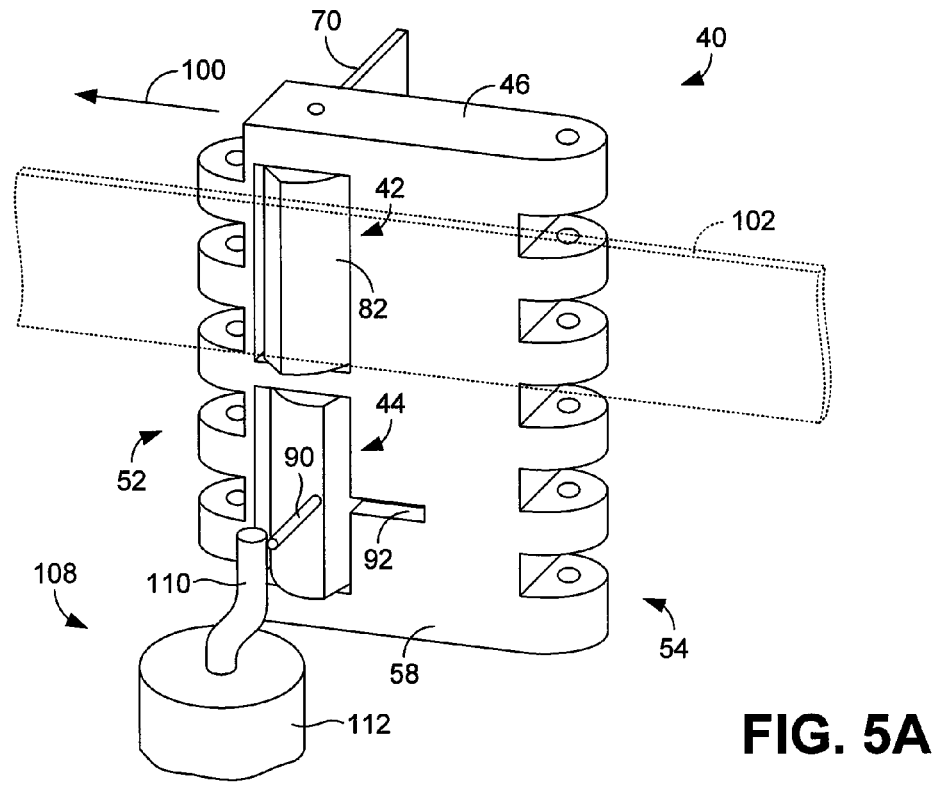
FIGS. 5A-5D are further perspective views of the conveyor belt module of FIGS. 2 and 3 illustrating selective actuation of an ejector of the module.
Figure 5B:
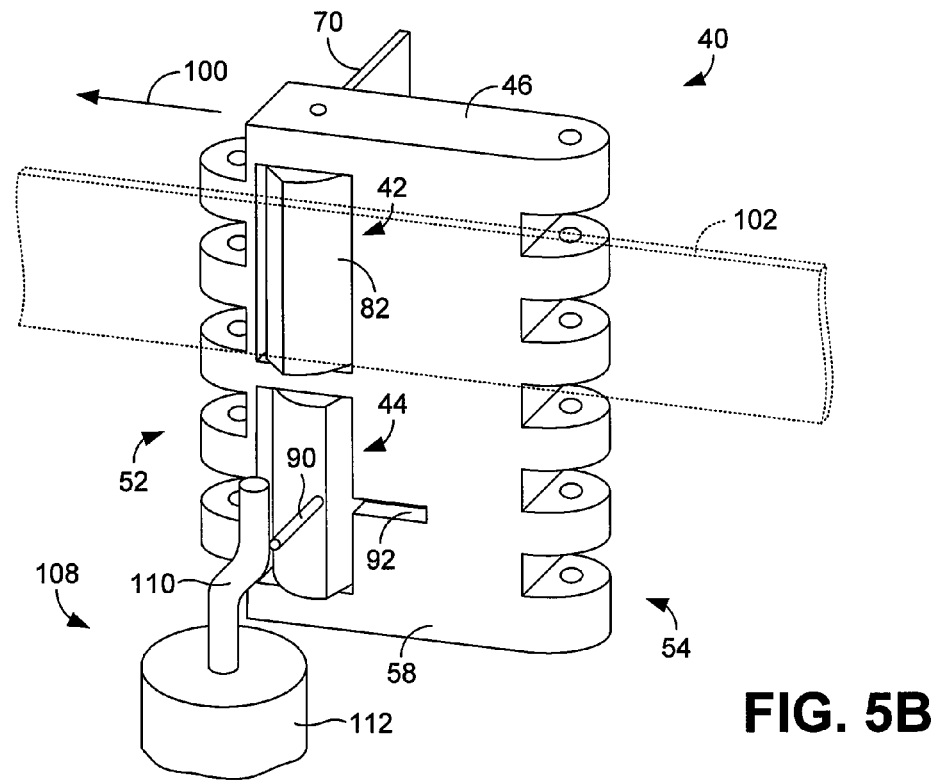
Figure 5C:
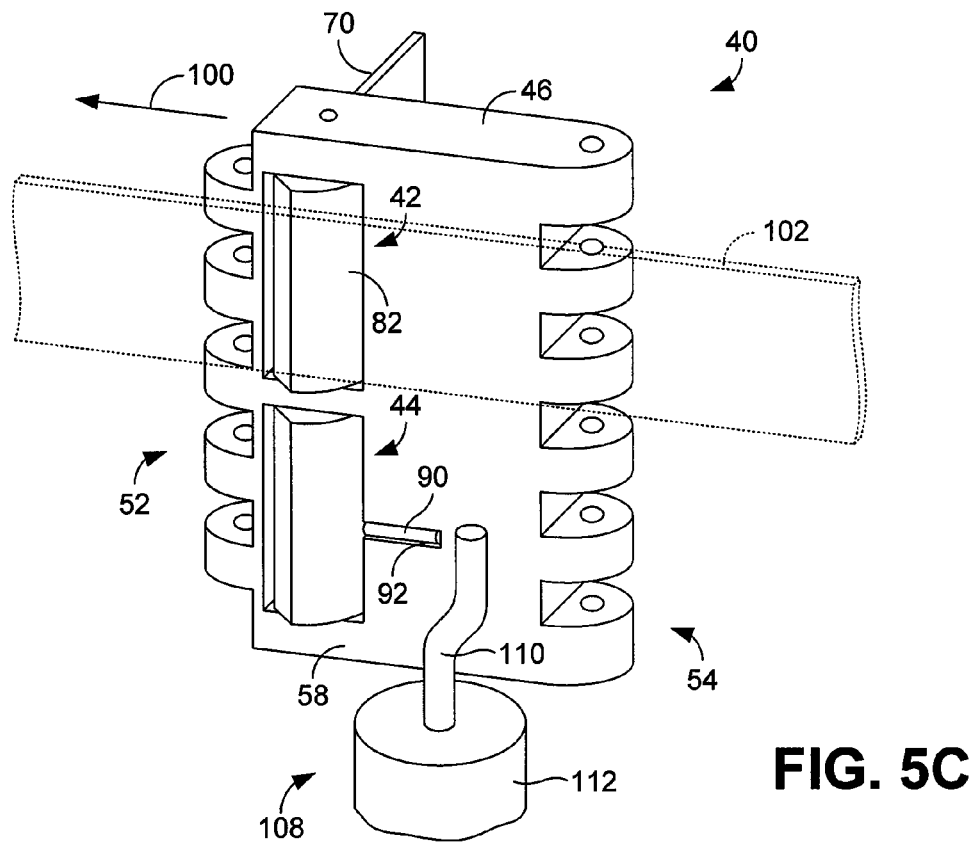

Actuation of the ejector 44 will now be described in relation to FIGS. 5A-5D. As with FIGS. 4A and 4B, it is assumed that the module 40 forms part of a vertically-oriented conveyor belt, which has been omitted from the figures for purposes of clarity. As shown in FIG. 5A, the module 40, and therefore the conveyor belt, is traveling in the direction identified by arrow 100 and is approaching a stationary ejector actuator 108 that is positioned at a predetermined point along the belt's path of travel. By way of example, the actuator 108 comprises a pneumatic or hydraulic linear actuator that is mounted to a vertically-oriented conveyor of which the vertically-oriented conveyor belt forms a part. In the embodiment of FIGS. 5A-5D, the actuator 108 comprises a vertically-extensible element 110 that can be retracted into or extended from a body 112 of the actuator. The retracted position is shown in FIG. 5A, while the extended position is shown in FIGS. 5B and 5C. When in the retracted position of FIG. 5A, the extensible element 110 will not make contact with actuation element 90 of the ejector 44 as the module 40 passes the actuator 108. Specifically, the actuation element 90 of the ejector 44 will pass over the extensible element 110, which is at a lower height than the actuation element. Accordingly, the ejector 44 will not be actuated and therefore will not be extended.

Figure 5D:
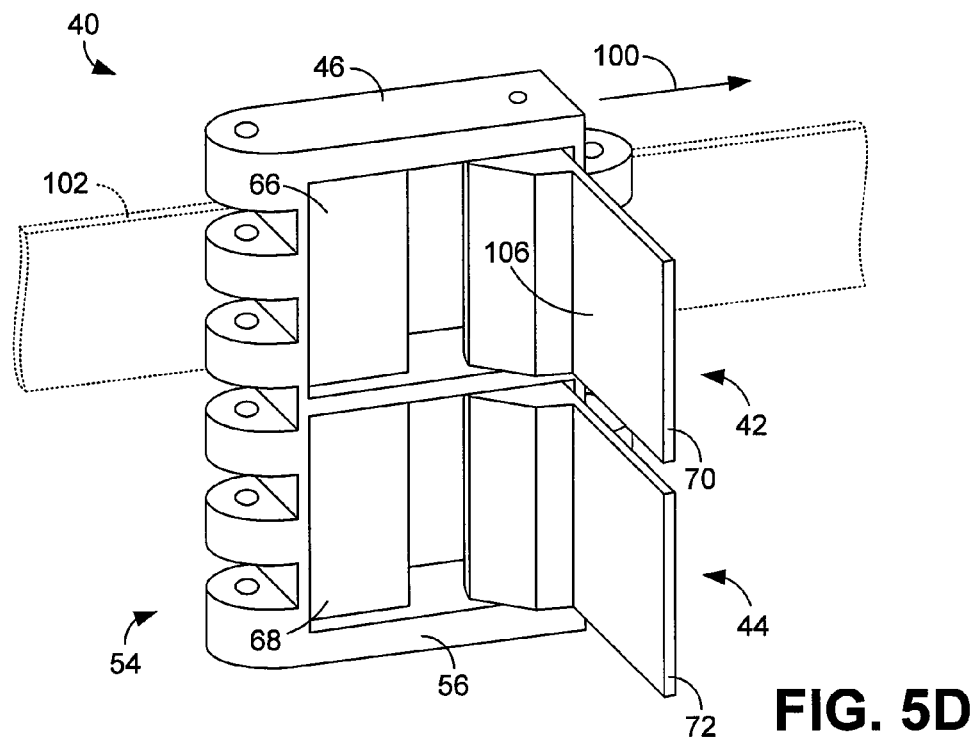

Referring to FIG. 5B, the extensible element 110 is shown in the extended position. In that position, the extensible element 110 extends farther from the ejector body 112 and therefore will contact the actuation element 90 of the ejector 44 as the module 40 passes. Notably, the extensible element 110 need only be extended a relatively small distance, such as approximately ⅛ to ½ inch. Therefore, the ejection actuator 108 can have a relatively small stroke. When extended, the extensible element 110 acts as an impediment to the actuation element 90. Accordingly, as the module 40 moves past the actuator 108, the actuation element 90 is displaced, which causes the ejector 44 to pivot. In some embodiments, the actuation element 90 is moved into the recess 92, as indicated in FIG. 5C, and the object interface 72 of the ejector 44 is extended to the point at which it, like the object interface 70 of the flight 42, is generally perpendicular to the front surface 56 of the module body 46, as indicated in FIG. 5D. As described below in relation to FIGS. 6A and 6B, such actuation of the ejector 44 causes an object held by the flight 42 to be ejected off of the horizontal-oriented conveyor on which the object is supported. Given that the ejector 44 need not remain in the fully-extended position to await an object like the flight 42 to serve the ejection functionality, the ejector can, in some embodiments, be biased toward the retracted position identified in FIGS. 2 and 3 by a suitable biasing element, such as a spring or magnet (not shown).

Figure 6A:
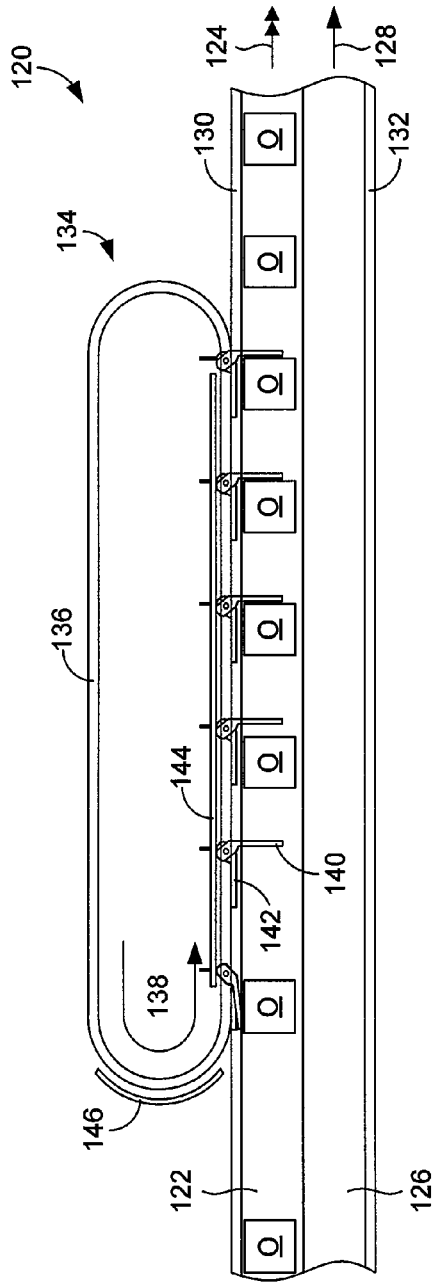
FIGS. 6A and 6B are schematic plan views of an embodiment of a system for controlling the spacing of and ejecting conveyed objects, the figures respectively illustrating a first case of operation in which no objects are ejected and a second case of operation in which an object is ejected.
Figure 6B:
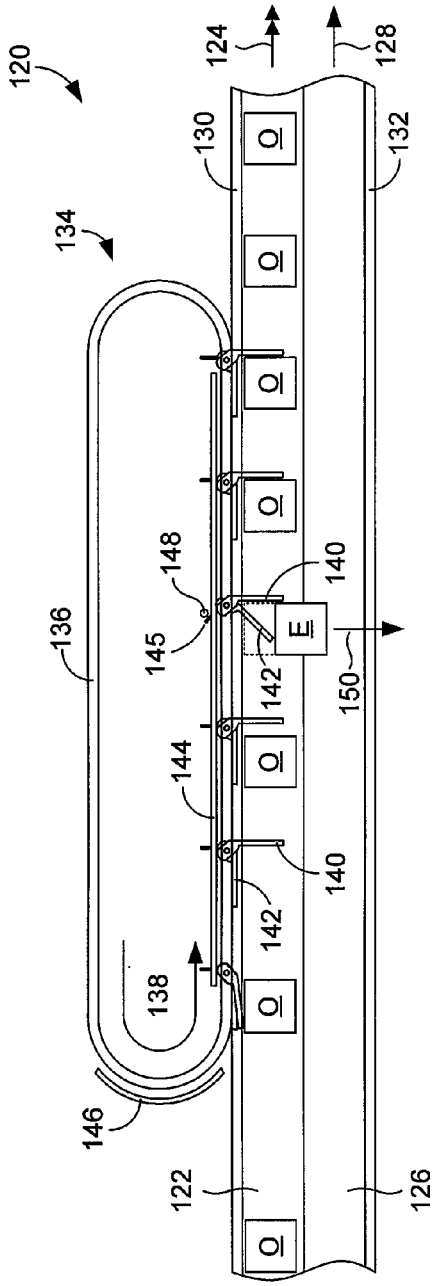

FIGS. 6A and 6B illustrate a further object spacing and ejecting system 120. Beginning with FIG. 6A, the system 120 includes a first horizontally-oriented conveyor belt 122 that conveys objects, O, in a direction of belt travel indicated by arrow 124. The system 10 further includes a second horizontally-oriented conveyor belt 126 that is directly adjacent and parallel to the first conveyor belt 126 and that travels in the direction of arrow 128. Opposed guide rails 130 and 132 bound the outer edges of the conveyor belts 122, 126.

The system 120 further comprises an object spacing control and ejection apparatus 134. The apparatus 134 includes a vertically-oriented conveyor belt 136 that is driven in the direction indicated by arrow 138. The conveyor belt 136 comprises a plurality of equally-spaced, colocated flights 140 and ejectors 142 (only the flights and ejectors adjacent the conveyor belt 122 being shown). In particular, the flights 140 and ejectors 142 are arranged in coaxial pairs in similar manner to the arrangement shown in FIGS. 2 and 3.

With further reference to FIG. 6A, the flights 140 are actuated by an actuation member 144. In particular, the cam surfaces of the flights 140 contact the actuation member 144 and that contact causes the flights to pivot outward from the conveyor belt 136 in the manner described above in relation to FIGS. 4A and 4B. Notably, the flights 140 actuate with relatively little torque such that they will not be forced to open against a directly adjacent object. In some embodiments, low-torque actuation is achieved by configuring the actuation member 144 to "give" under forces transmitted by the flights 140 and/or by constructing the cam surfaces of the flights of a relatively low-friction material. As is further indicted in FIG. 6A, the object spacing and ejecting apparatus 134 can further comprise a flight retraction mechanism 146. In the embodiment of FIGS. 6A and 6B, the retraction mechanism 146 comprises a rail that forces the flights 140 to return to their retracted state and further prevents the flights from unintentionally transitioning to the extended state. Through provision of the retraction mechanism 146, the flights 140 remain in the retracted state until they reach the front side of the system 134, thereby avoiding situations in which an approaching object, O, can collide with a partially-extended flight.

FIG. 6A further illustrates spacing control exercised on the objects, O. As the objects, O, are transported by the horizontally-oriented conveyor belt 122, which travels at a speed greater than that of the vertically-oriented conveyor belt 136, the objects abut the fully-extended flights 136 such that the relative spacing of the objects is equal to the relative spacing of the flights.

FIG. 6B, illustrates ejection of a selected object. In FIG. 6B, the spacing of the objects, O, has been controlled in similar manner to that described in relation to FIG. 6A. However, in FIG. 6B, it has been determined to eject one of the objects, object "E," from the first horizontally-oriented conveyor belt 122 to the second horizontally-oriented conveyor belt 126. In some embodiments, the determination to eject the object, E, can be made in response to detecting a defect in the object. Example defects include improperly filled objects (e.g., bottles), missing or misaligned labels, missing closures (e.g., bottle caps), or any other defect. Such defects can be detected using suitable detection sensors, such as photo-eyes. Notably, however, the determination to eject an object need not be based on a detected defect. For example, in other embodiments, it may be desirable to eject only non-defective objects and permit defective objects to remain on the conveyor belt 122. In still other embodiments, it may be determined to intermittently eject objects, for example every other object.

Irrespective of how the determination is made to eject the object, E, the object is ejected by actuating the adjacent ejector 142. In particular, the ejector 142 associated with the flight 140 against which the object, E, abuts is pivoted by actuating the ejector using a suitable ejector actuator so as to trip the actuation element 145 of the ejector. For instance, the actuation element 145 is actuated by the extensible element 148 of an ejector actuator of similar nature to the actuator 108 described in relation to FIGS. 5A-5D. When the ejector 142 is pivoted in that manner it pushes the object, E, transversely across the first horizontally-oriented conveyor belt 122 in the direction of arrow 150 and onto the second horizontally-oriented conveyor belt 126, which can then deliver the object to a location other than that to which the other objects, O, are to be delivered.

As noted above, various alternatives to the disclosed embodiments are possible. In one such alternative, the ejector can have a configuration different from that of its associated flight. For instance, the ejector can be configured as a narrow finger that can be pivotally or linearly extended to eject an object. The particular configuration and manner of actuation of the ejector may depend upon the nature of the objects that are to be ejected. In a further alternative, the ejector actuator can be horizontally oriented such that its extensible element can be horizontally extended toward and horizontally retracted away from a vertically-oriented conveyor belt that comprises the ejectors and their associated actuator elements.

The invention claimed is:

1. Apparatus for controlling spacing of objects conveyed by an object conveyor and for selectively ejecting objects from the object conveyor, the apparatus comprising:
   flights that extend transversely across the object conveyor to limit travel of the objects to control their relative spacing; and
   ejectors associated with the flights that can be selectively actuated to eject the objects whose travel has been limited by the associated flights;
   wherein the flights and the ejectors are actuable from a retracted state to an extended state.

2. The apparatus of claim 1, wherein the flights and ejectors are colocated such that each flight has a directly adjacent ejector that can eject an object limited by its colocated flight.

3. The apparatus of claim 1, further comprising a vertically-oriented conveyor belt to which the flights and ejectors are pivotally mounted and wherein the flights and ejectors comprise object interfaces that are substantially parallel to an outer surface of the vertically-oriented conveyor belt in the retracted state and substantially perpendicular to the conveyor belt in the extended state.

4. The apparatus of claim 3, wherein the vertically-oriented conveyor belt is positioned adjacent a lateral edge of the object conveyor.

5. The apparatus of claim 3, further comprising a stationary actuation member adapted to actuate the flights when they are positioned adjacent the object conveyor.

6. The apparatus of claim 5, wherein the actuation member comprises a thin bar or plate that the flights contact during actuation, and wherein that contact causes the flights to pivot outward from the vertically-oriented conveyor belt.

7. The apparatus of claim 3, further comprising an ejector actuator adapted to selectively actuate individual ejectors.

8. The apparatus of claim 7, wherein the ejector actuator comprises a linear actuator including an extensible element that can be selectively extended to actuate an ejector.

9. The apparatus of claim 8, wherein the ejectors comprise actuation elements that extend from the ejectors and that are tripped by the extensible element of the ejector actuator when extended, thereby causing the ejector to pivot outward from the vertically-oriented conveyor belt.

10. The apparatus of claim 9, wherein the actuation elements comprise pins that extend from bodies of the ejectors.

11. Apparatus for controlling spacing of objects conveyed by a horizontally-oriented conveyor and for selectively ejecting individual objects from the horizontally-oriented conveyor, the apparatus comprising:
    a vertically-oriented conveyor belt positioned adjacent the horizontally-oriented conveyor, the vertically-oriented conveyor belt including a plurality of flights that can be actuated from a retracted state to an extended state and a plurality of ejectors colocated with the flights such that each flight comprises a directly adjacent ejector, the ejectors being adapted to be selectively actuated from a retracted state to an extended state, wherein the flights when extended limit travel of the objects to control their relative spacing along the horizontally-oriented conveyor and wherein the ejectors when actuated eject the object limited by its associated flight;
    a stationary actuation member adapted to actuate the flights when they are near the horizontally-oriented conveyor; and
    a stationary ejector actuator adapted to, separate from actuation of the flights, selectively actuate individual ejectors.

12. The apparatus of claim 11, wherein the flights and the ejectors each comprise an object interface and wherein the object interfaces of the flights and the ejectors are generally parallel with an outer surface of the vertically-oriented conveyor belt in the retracted state and generally perpendicular to the outer surface of the vertically-oriented conveyor belt in the extended state.

13. The apparatus of claim 11, wherein the actuation member comprises a thin bar or plate that the flights contact during actuation, and wherein that contact causes the flights to pivot outward from the vertically-oriented conveyor belt.

14. The apparatus of claim 11, wherein the ejector actuator comprises a linear actuator including an extensible element that can be selectively extended to actuate an ejector.

15. The apparatus of claim 14, wherein the ejectors comprise actuation elements that extend from the ejectors and that are tripped by the extensible element of the ejector actuator when extended, thereby causing the ejector to pivot outward from the vertically-oriented conveyor belt.

16. The apparatus of claim 15, wherein the actuation elements comprise pins that extend from bodies of the ejectors.

17. The apparatus of claim 11, further comprising a retraction mechanism adapted to return at least the flights to the retracted state.

18. A conveyor belt comprising:
    an outer surface;
    an inner surface;
    a plurality of flights located at predetermined positions along the length of the conveyor belt, the flights comprising object interfaces and being adapted to be actuated from a retracted state in which the object interface is generally parallel to the outer surface of the conveyor belt to an extended state in which the object interface is generally perpendicular to the outer surface of the conveyor belt, wherein the flights when extended limit travel of objects conveyed by a separate conveyor to control their relative spacing along the separate conveyor; and a plurality of ejectors colocated with the flights such that each flight comprises a directly adjacent ejector and the flights and ejector form pairs, the ejectors being adapted to be selectively actuated from a retracted state in which they do not interact with an object limited by its directly adjacent flight to an extended state in which the ejector ejects the object limited by its directly adjacent flight.

19. The conveyor belt of claim 18, wherein the belt is a modular conveyor belt comprising multiple coupled modules and wherein each flight and ejector pair is provided within a single module.

20. The conveyor belt of claim 18, wherein the ejectors each comprise an object interface and wherein the object interfaces of the ejectors are generally parallel with the outer surface of the conveyor belt in the retracted state and generally perpendicular to the outer surface of the conveyor belt in the extended state.

21. The conveyor belt of claim 18, wherein the flights and ejectors each comprise a body, the body of each flight defining a cam surface used to actuate the flight and an actuation element extending from the body of each ejector, the actuation element being used to actuate the ejector.

22. The conveyor belt of claim 18, wherein the cam surfaces are rounded and the actuation elements comprise pins that are generally perpendicular to the inner surface of the conveyor belt when the ejectors are in the retracted state.

23. A conveyor belt module comprising:

a body that defines a front surface, a rear surface, a leading edge, and a trailing edge;

a flight pivotally mounted to the module body, the flight comprising an object interface and a body, the object interface being adapted to limit travel of an object being conveyed by an adjacent conveyor and the flight body defining a cam surface adapted to contact an actuation member and pivot the flight outward from the module body, the flight being actuable from a retracted state in which the object interface is generally parallel to the front surface of the module body to an extended state in which the object interface is generally perpendicular to the front surface of the module body; and an ejector pivotally mounted to the module body adjacent the flight, the ejector comprising an object interface, a body, and an actuation element that extends out from the ejector body, the ejector object interface being adapted to eject an object being limited by the flight and the actuation element being adapted to contact an ejector actuator and pivot the ejector, the ejectors being adapted to be selectively actuated from a retracted state in which they do not interact with the object being limited by the flight to an extended state in which the ejector ejects the object being limited by the flight.

24. The conveyer belt module of claim 23, wherein the body comprises a first cavity in which the flight is pivotally mounted and a second cavity in which the ejector is pivotally mounted.

25. The conveyor belt module of claim 24, wherein the second cavity is positioned directly below the first cavity.

26. The conveyor belt module of claim 23, wherein the leading and trailing edges comprise coupling elements that enable coupling of the module to another module of a conveyor belt.

27. A method for controlling spacing of objects conveyed by a horizontally-oriented conveyor operated at a first linear speed and for selectively ejecting objects from the horizontally-oriented conveyor, the method comprising:

operating a vertically-oriented conveyor belt adjacent the horizontally-oriented conveyor at a linear speed that is slower than the first linear speed, the belt comprising a plurality of colocated flights and ejectors;

extending the flights when they are positioned alongside the horizontally-oriented conveyor such that the flights are substantially perpendicular to a direction of travel of the objects;

limiting travel of the objects conveyed by the horizontally-oriented conveyor with the extended flights;

selecting an object limited by one of the flights to be ejected; and actuating the ejector colocated with the flight that limits the selected object so as to move the selected object off of the horizontally-oriented conveyor.

* * * * *